United States Patent
Collias et al.

(10) Patent No.: US 12,060,462 B2
(45) Date of Patent: *Aug. 13, 2024

(54) RECYCLING A USED ABSORBENT HYGIENE PRODUCT OR ITS COMPONENTS USING HYDROTHERMAL TREATMENT

(71) Applicant: The Procter & Gamble Company, Cincinnati, OH (US)

(72) Inventors: Dimitris Ioannis Collias, Mason, OH (US); Rodrigo Rosati, Frankfurt am Main (DE); Stephen Anthony DeRose, Reading, OH (US); Shuji Maeno, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,256

(22) Filed: Mar. 30, 2023

(65) Prior Publication Data

US 2023/0332052 A1    Oct. 19, 2023

Related U.S. Application Data

(60) Provisional application No. 63/330,375, filed on Apr. 13, 2022.

(51) Int. Cl.
C08J 11/14    (2006.01)
C10G 1/04     (2006.01)
C10G 1/10     (2006.01)

(52) U.S. Cl.
CPC .............. *C08J 11/14* (2013.01); *C10G 1/047* (2013.01); *C10G 1/10* (2013.01); *C10G 2300/1003* (2013.01); *C10G 2300/4006* (2013.01); *C10G 2300/4012* (2013.01); *C10G 2400/20* (2013.01); *C10G 2400/30* (2013.01)

(58) Field of Classification Search
None
See application file for complete search history.

(56) References Cited

U.S. PATENT DOCUMENTS

| | | | |
|---|---|---|---|
| 5,731,483 A | 3/1998 | Stabel et al. | |
| 6,143,820 A | 11/2000 | Klier | |
| 6,180,845 B1 | 1/2001 | Catallo et al. | |
| 8,383,746 B2 | 2/2013 | Torii | |
| 9,095,853 B2 | 8/2015 | Somma | |
| 9,156,034 B2 | 10/2015 | Somma | |
| 9,822,203 B2 | 11/2017 | Haag | |
| 2004/0034262 A1 | 2/2004 | Van De Beld et al. | |
| 2004/0232046 A1 | 11/2004 | Tanaka et al. | |
| 2006/0280669 A1 | 12/2006 | Jones | |
| 2009/0267349 A1 | 10/2009 | Spitzauer et al. | |
| 2009/0314700 A1 | 12/2009 | Mabuchi | |
| 2010/0180805 A1 | 7/2010 | Cheiky | |
| 2010/0221158 A1 | 9/2010 | Kitamura et al. | |
| 2010/0287825 A1 | 11/2010 | Humphreys | |
| 2011/0094674 A1 | 4/2011 | Oetjen | |
| 2012/0302445 A1 | 11/2012 | Rudolph et al. | |
| 2013/0296619 A1 | 11/2013 | Iaccino et al. | |
| 2016/0237617 A1 | 8/2016 | Yamaguchi et al. | |
| 2016/0362609 A1 | 12/2016 | Ward et al. | |
| 2017/0198105 A1 | 7/2017 | Lee et al. | |
| 2017/0226436 A1 | 8/2017 | Gillespie et al. | |
| 2017/0362512 A1 | 12/2017 | Hornung et al. | |
| 2019/0299181 A1* | 10/2019 | Flynn | B01J 8/20 |
| 2020/0071619 A1 | 3/2020 | Humphreys et al. | |
| 2020/0149220 A1 | 5/2020 | Konishi et al. | |
| 2020/0238574 A1 | 7/2020 | Konishi et al. | |
| 2020/0369966 A1 | 11/2020 | Bitting et al. | |
| 2021/0130262 A1 | 5/2021 | Wu et al. | |
| 2021/0130699 A1 | 5/2021 | Bitting et al. | |
| 2022/0097279 A1 | 3/2022 | Van Zijl et al. | |
| 2022/0117800 A1 | 4/2022 | Collias et al. | |
| 2022/0119618 A1 | 4/2022 | Collias | |
| 2022/0134398 A1 | 5/2022 | Collias et al. | |
| 2022/0267561 A1 | 8/2022 | Collias et al. | |

FOREIGN PATENT DOCUMENTS

| | | |
|---|---|---|
| DE | 4204094 A1 | 8/1993 |
| EP | 1990106 A1 | 11/2008 |
| EP | 3783054 A1 | 2/2021 |
| EP | 3783056 A1 | 2/2021 |
| JP | 2007007622 A * | 1/2007 |
| JP | 2013199626 A | 10/2013 |
| KR | 102341361 B1 | 12/2021 |
| WO | 2016151120 A1 | 9/2016 |
| WO | 2021042113 A1 | 3/2021 |

(Continued)

OTHER PUBLICATIONS

Machine translation JP 2007-007622. Retrieved Sep. 20, 2023 (Year: 2023).*
PCT Search Report and Written Opinion for PCT/US2023/016790 dated Jul. 12, 2023, 12 pages.
Adebayo-Ige et al. "Mixed Plastics Waste to Ethylene and Propylene Feedstocks", Senior Design Reports (CBE), University of Pennsylvania, Scholarly Commons, Department of Chemical & Biomolecular Engineering, Apr. 21, 2020, 269 pages.
Xu et al., "Hydrothermal Liquefaction of Biomass in Hot-Compressed Water, Alcohols, and Alcohol-Water Co-solvents for Biocrude Production", Application of Hydrothermal Reactions to Biomass Conversion, Green Chemistry and Sustainable Technology, Chapter 8, Jan. 1, 2014, pp. 171-187.

(Continued)

*Primary Examiner* — In Suk C Bullock
*Assistant Examiner* — Alyssa L Cepluch
(74) *Attorney, Agent, or Firm* — Kathleen Y. Carter; James Ernest Oehlenschlager

(57) ABSTRACT

Used AHP or its components is converted into low molecular weight hydrocarbons using HTT reactor. These low molecular weight hydrocarbons produce ethylene, propylene, and other chemicals when fed into a steam cracker, which can be used to produce recycled components of the AHP or a fully recycled AHP.

16 Claims, No Drawings

(56) References Cited

FOREIGN PATENT DOCUMENTS

| WO | WO-2022011241 A1 * | 1/2022 | ............. B01D 3/143 |
| WO | 2022093523 A1 | 5/2022 | |

OTHER PUBLICATIONS

All Office Actions; U.S. Appl. No. 17/498,781, filed on Oct. 12, 2021.

All Office Actions; U.S. Appl. No. 17/498,783, filed on Oct. 12, 2021.

All Office Actions; U.S. Appl. No. 17/498,780, filed on Oct. 12, 2021.

All Office Actions; U.S. Appl. No. 18/128,259, filed on Mar. 30, 2023.

All Office Actions; U.S. Appl. No. 17/678,707, filed on Feb. 23, 2022.

Anita Gerina-Ancane et al. "Research and analysis of absorbent hygiene product (AHP) recycling", Engineering for Rural Development, Jelgava, May 25-27, 2016, pp. 904-910.

Basedow, A. M., and Ebert, K. H, "Ultrasonic Degradation of Polymers in Solution", Advances in Polymer Science, 22, 1977, pp. 83-148.

Ching Teck Wei et al: "Microwave-Assisted HydrothermalDecomposition of Super Absorbent Polymers", ACS Sustainable Chemistry & Engineering, vol. 8, No. 38, Aug. 31, 2020, pp. 14504-14510.

Ebrahimi, R., et al., "The Study of Ultrasonic Degradation ofSuperabsorbent Hydrogels", Organic Chemistry International vol. 2012, Sep. 25, 2012, pp. 1-5.

Jin et al. , Conversion of polyethylene waste into clean fuels and waxes via hydrothermal processing(HTP), ScienceDirect, Fuel 273, Mar. 26, 2020, pp. 1-11.

Jin et al. , Low-pressure hydrothermal processing of mixed polyolefin wastes into clean fuels, ScienceDirect, Fuel 294, Feb. 15, 2021 pp. 1-9.

Nakano Akihiko et al, "Degradation of Aqueous Poly(acrylic Acid) and Its Sodium Salt Solutions by High-Speed Stirring", Journal of Applied Polymer Science, vol. 22, Apr. 1, 1978, pp. 2207-2215.

Odegard: "LCA of waste treatment of diaper material", Retrieved from the Internet: URL:https://cedelft.eu/wp-content/uploads/sites/2/2021/04/CE_Delft_2M03_LCA_of_waste_treatment_of_diaper_material_Def.pdf, May 30, 2018, 37 pages.

Prajapat, A. L., and Gogate, P. R., "Ultrasonics Sonochemistry", ScienceDirect, Ultrasonics Sonochemistry, vol. 32, Mar. 22, 2016, pp. 290-299.

Shukla, N. B., and Madras, G., "Photo, Thermal, and Ultrasonic Degradation of EGDMA-Crosslinked Poly(acrylic acid-co-sodium acrylate-co-acrylamide) Superabsorbents", Journal of Applied Polymer Science, vol. 125, Dec. 26, 2011, pp. 630-639.

Shukla, N. B., et al., "Ultrasonic Degradation of Poly(acrylic acid)", Journal of Applied Polymer Science, vol. 112, Jan. 23, 23, 2009, pp. 991-997.

U.S. Unpublished U.S. Appl. No. 18/128,259, filed on Mar. 30, 2023, to Dimitris Ioannis Collias et al.

Xinming Li et al: "Ultraviolet-induced decomposition of acrylicacid-based superabsorbent hydrogels crosslinked with N,N-methylenebisacrylamide", Journal of Applied Polymer Science, vol. 108, Mar. 6, 2008, pp. 3435-3441.

Yuriy Budyk et al. "Hydrothermal carbonization of disposable diapers", Journal of Environmental Chemical Engineering, vol. 7, Aug. 2, 2019, 7 pages.

Soni, et al., "Thermochemical Recycling of Waste Plastics by Pyrolysis: A Review", In Journal of Energy & Fuels, vol. 35, Issue 16, Aug. 19, 2021, pp. 12763-12808.

* cited by examiner

RECYCLING A USED ABSORBENT HYGIENE PRODUCT OR ITS COMPONENTS USING HYDROTHERMAL TREATMENT

FIELD OF THE INVENTION

The present invention generally relates to recycling of a used absorbent hygiene product (used AHP) using hydrothermal treatment (HTT).

BACKGROUND OF THE INVENTION

Recycling of AHPs (i.e., baby diapers, feminine-protection pads, and adult incontinence pads) is good for the environment and needed to achieve the sustainability goals of many consumer companies. These goals are about using 100% recycled materials and having zero consumer and manufacturing waste go to landfill. In addition to these goals, successful recycling benefits the environment, stimulates the economy, improves people's health and water quality, and generates energy needed by consumers in developing regions of the world.

The materials of AHPs are typically SAP, PE, PP, polyester, adhesives, elastics, and cellulose fibers. SAP is a water-absorbing, water-swellable, and water-insoluble powdered solid which is a crosslinked and partially neutralized homopolymer of glacial acrylic acid. SAP has an exceptionally high ability to absorb aqueous liquids, such as contaminated water or urine. PP is typically a large component of the non-woven component, PE is typically a large component of the backsheet film, and propylene is the typical feed material used to produce the SAP of an AHP.

Recycling of used AHPs involves cleaning of the AHPs from the soils accumulated during their use and separating the various materials into recycled material streams, such as cellulose stream, plastic stream, and SAP stream. Non-limiting examples of processes that produce purified and separated material streams of used SAP from recycled AHPs are disclosed and claimed in U.S. Pat. Nos. 9,095,853 and 9,156,034; both assigned to Fater S.p.A, based in Pescara, Italy. A known limitation is that the streams of recovered cellulose, plastic and SAP, produced via mechanical separation methods, are of lower quality and contain contaminants, therefore making their use back into new AHPs difficult. For the purpose of recycling used AHPs into building blocks for the chemical industry, such as naphtha, one could consider pyrolysis, which is well known for converting mixed plastic waste into pyrolysis oil to be used along with virgin fossil naphtha in steam crackers; however, used AHPs contain significant amount of oxygen (e.g., in SAP, polyester, and cellulose) and pyrolysis is well known to be limited to handle only hydrocarbon polymers. Oxygenated polymers would significantly reduce the yield of pyrolysis oil, hinder the quality of the pyrolysis oil, and increase the yield of gases.

Accordingly, there is a need to recycle used AHPs using energy-efficient methods and produce a single material stream from the plastic, cellulose fiber, and SAP components of used AHPs, instead of separate material streams. This single material stream can then be further divided into multiple fractions, with high yield of liquid fractions, such as naphtha, which can be used in typical chemical industry unit operations to produce feedstock chemicals for the various components of AHPs, thus fully recycling used AHPs into new AHPs. However, those fractions, such as naphtha, to be used in typical chemical industry, need to have low content in undesired elements, such as oxygen, chlorine, nitrogen, sulfur. Alternatively, the feedstock chemicals can be used to produce recycled materials for other applications in upcycling or downcycling operations.

SUMMARY OF THE INVENTION

In embodiments of the present invention, a method for recycling a used absorbent hygiene product (used AHP) is presented. The method comprises feeding a stream comprising said used AHP in a hydrothermal treatment (HTT) reactor operating at an HTT reactor temperature, at an HTT reactor pressure, and for an HTT reactor residence time; and producing a liquid product stream, wherein said liquid product stream comprises waste-derived fuel products.

In embodiments of the present invention, a method for recycling a used AHP is presented. The method comprises: a) size reduction of said used AHP into pieces; b) mixing said used AHP pieces with a mixed plastic waste stream to produce a mixed dry stream; c) feeding said mixed dry stream to an extruder to produce a melt stream; d) providing an aqueous solution; e) contacting said melt stream with said aqueous solution to produce a mixed wet stream; f) feeding said mixed wet stream in a hydrothermal treatment (HTT) reactor operating at an HTT reactor temperature, at an HTT reactor pressure, and for an HTT reactor residence time; g) producing a liquid product stream from said HTT reactor comprising waste-derived fuel products; and h) depressurizing and cooling said liquid product stream.

In embodiments of the present invention, a method for recycling a used AHP is presented. The method comprises feeding a stream comprising said used AHP and mixed plastic waste in a hydrothermal treatment (HTT) reactor operating at an HTT reactor temperature of about 450° C., at an HTT reactor pressure of about 3.4 MPa, and for an HTT reactor residence time of about 45 min; and wherein a liquid product stream from said HTT reactor comprises waste-derived fuel products.

DETAILED DESCRIPTION OF THE INVENTION

I Definitions

As used herein, the term "used AHP" refers to an AHP which has already been produced industrially and/or used commercially, for example, as a baby diaper, feminine-protection pad, adult incontinence pad, or other uses. As such, used AHP can be post-industrial recycled AHP (PIR AHP) or post-consumer recycled AHP (PCR AHP).

As used herein, the term "degradation" refers to conversion of a material to a product that comprises low molecular weight hydrocarbon, via mechanisms, such as partial de-polymerization, de-crosslinking, molecular backbone breaking, partial hydrogenation or any combination of the above actions. A non-limiting example of degradation is the conversion of plastic waste to a product containing naphtha and other low molecular weight hydrocarbons in a pyrolysis process. Optionally, the degradation process might include hydrothermal process or hydrogenation of the degradation products.

As used herein, the term "hydrothermal treatment (HTT)" refers to a process in which waste is converted into waste-derived fuel product in the presence of water and optionally catalysts at elevated temperatures, such as 250° C. to 500° C., and elevated pressures, such as 0.1 MPa to 30 MPa. Under these conditions, water can be in supercritical conditions if its temperature exceeds the critical temperature of water of 374° C. and its pressure exceeds the critical pressure of water of 22.064 MPa. Alternatively, if the water temperature or pressure are lower than the respective critical temperature and critical pressure then the water is in sub-critical conditions.

As used herein, the term "waste-derived fuel product" refers to energy-containing materials derived from the processing of waste, such as biomass, plastic waste, etc. and comprising "low molecular weight hydrocarbons". The waste-derived fuel product is not primarily produced from virgin fossil resources, such as crude oil, natural gas, coal, etc. Non-limiting examples of low molecular weight hydrocarbons are naphtha (typically, $C_5$ to $C_9$ hydrocarbons with atmospheric boiling points between about 30° C. and about 175° C. to 200° C.) and diesel (typically, $C_9$ to $C_{25}$ hydrocarbons with atmospheric boiling points between about 175° C. to 200° C. and about 350° C.).

As used herein, the term "SAP" refers to crosslinked, partially neutralized, and poly(acrylic acid)-based superabsorbent polymer. SAP examples are disclosed in U.S. Pat. Nos. 8,383,746 and 9,822,203. Typically, SAP is capable of absorbing a 0.9% saline solution at 25° C. at least 10 times its dry weight. The typical absorption mechanism is osmotic pressure. SAP that absorbs water or aqueous solutions becomes a gel.

II Feed Stream

Unexpectedly, it has been found that used AHPs (despite the fact that they contain oxygenated materials, such as SAP, polyester, and cellulose) fed into an HTT reactor operating at a temperature between about 250° C. and about 500° C., pressure between about 0.1 MPa and about 30 MPa, and residence time between about 5 min and about 180 min produce a liquid product stream comprising low molecular weight hydrocarbons. This liquid product stream is similar in composition to liquid product streams produced when plastic waste is fed into the HTT reactor operated under the same conditions as in the case of used AHPs. More specifically, the liquid product stream comprises n-paraffins, iso-paraffins, naphthenes, olefins, aromatics, or mixtures thereof. The liquid product stream has high calorific value and can be subjected to additional treatment (such as hydrogen treatment) to remove unwanted compounds (such as nitrogen, oxygen, chlorine, iron, sodium, and calcium) and thus be suitable for feeding into typical processes of the chemical industry, such as a steam cracker.

Without wishing to be bound by any theory, applicants believe that the water in the HTT reactor (from the moisture of the used AHP, or water added to the used AHP before the reactor, or water added in the HTT reactor) causes degradation of the AHP materials and production of a liquid product stream, a gas product stream, and solid product. The liquid product stream comprises low-molecular weight hydrocarbons and has low content of undesired elements, such as oxygen, chlorine, nitrogen, sulfur. Also, the liquid product stream comprises fuel components, such as naphtha, diesel, gasoline, or other fuels. The liquid product stream may be also referred to as synthetic crude or syncrude.

In embodiments of the present invention, the used AHP comprises SAP, cellulose, PE, PP, polyester, and adhesive. The AHP may be designed with lower mass of oxygen-containing materials, for example the AHP may not contain cellulose and PET and contain PE and PP instead. In embodiments of the present invention, the used AHP comprises cross-linked cellulose. In embodiments of the present invention, the used AHP comprises less than about 20% cellulose. In embodiments of the present invention, the used AHP comprises less than about 15% cellulose. In embodiments of the present invention, the used AHP comprises more than about 20% SAP. In embodiments of the present invention, the used AHP comprises more than about 30% SAP.

In embodiments of the present invention, an AHP comprises a non-woven, a backsheet film, and an SAP. In embodiments of the present invention, an AHP comprises a non-woven, a backsheet film, and an SAP; wherein said non-woven comprises PP; wherein said backsheet film comprises PE; and wherein said SAP comprises poly(acrylic acid) produced from propylene.

The used AHP stream is fed into the HTT reactor. In embodiments of the present invention, said used AHP stream comprises a used AHP. In embodiments of the present invention, the used AHP comprises about 60% moisture. In embodiments of the present invention, the used AHP comprises moisture between about 5% and about 90%. In embodiments of the present invention, the used AHP comprises moisture between about 10% and about 80%. In embodiments of the present invention, the used AHP comprises moisture between about 20% and about 50%. This moisture can be part of the urine or other body exudates in the used AHP, preferably inside the SAP, thus favoring an intimate contact between water and SAP for a faster reaction in the HTT reactor.

In embodiments of the present invention, the used AHP stream comprises an aqueous solution. In embodiments of the present invention, said aqueous solution is in supercritical conditions. In embodiments of the present invention, the used AHP stream comprises water. The water in the used AHP stream can be RO water, regular tap water, or water containing dissolved inorganic salts at various salt concentrations. The used AHP stream may contain significant amounts of water. The water removed from the used AHP prior to the feeding of the used AHP to the extruder prior to the HTT reactor may be recycled to prepare the aqueous solution. In embodiments of the present invention, the process may not require use of virgin water, as it may recycle the water recovered from the incoming used AHP stream; alternatively, the recovered water, from the used AHP stream, may cover at least about 50% of the water needs of the process.

In embodiments of the present invention, the used AHP stream comprises between about 20% and about 90% said used AHP on a dry basis and between about 10% and about 80% said aqueous solution. In embodiments of the present invention, the used AHP stream comprises between about 40% and about 80% said used AHP on a dry basis and between about 20% and about 60% said aqueous solution.

The used AHP may also be dried, prior to being fed into the HTT reactor, to adjust its water content. More specifically, the used AHP stream may be dried to water content of less than 100%, more preferably less than about 20%, and most preferably less than about 5%, prior to being fed into the HTT reactor.

The used AHP may be dried and reduced to pellets with methods known in the art, such the SFD system, commercially available from Super Faiths Inc. Alternatively, after been dried, the used AHP may be mixed and compounded with other plastic waste and reduced into pellets to be fed into the HTT reactor.

In embodiments of the present invention, said used AHP is size reduced to pieces. The size reduction can be of any type known to those skilled in the art. In embodiments of the present invention, said size reduction is selected from the group comprising grinding, chipping, pelletization, granulation, flaking, powdering, shredding, milling, or compression and expansion. In embodiments of the present invention, the used AHP pieces have an average size. In embodiments of the present invention, the average size of the pieces of the used AHP is between about 0.1 mm and about 10 cm. In embodiments of the present invention, the average size of the pieces of the used AHP is between about 1 mm and about 8 cm. In embodiments of the present invention, the average size of the pieces of the used AHP is between about 1 cm and about 6 cm. In embodiments of the present invention, the average size of the pieces of the used AHP is between about 1.5 cm and about 5 cm. Furthermore, the size reduction method can be followed by a method to remove materials, such as halogen.

In embodiments of the present invention, said used AHP is size reduced to pieces; wherein said pieces are fed into an extruder to produce a melt stream; and wherein said melt stream is contacted with an aqueous solution to produce said used AHP stream. In embodiments of the present invention, said stream comprises said used AHP and a mixed plastic waste. In embodiments of the present invention, said used AHP stream comprises about 25% said used AHP on a dry basis and about 75% mixed plastic waste on a dry basis. In embodiments of the present invention, said used AHP stream comprises between about 5% and about 40% said used AHP on a dry basis and between about 60% and about 95% mixed plastic waste on a dry basis. In embodiments of the present invention, said used AHP stream comprises about 100% said used AHP on a dry basis. In embodiments of the present invention, said used AHP stream comprises between about 10% and about 30% said used AHP on a dry basis and between about 70% and about 90% mixed plastic waste on a dry basis. In embodiments of the present invention, said used AHP stream comprises between about 10% and about 30% said used AHP on a dry basis and between about 70% and about 90% mixed plastic waste on a dry basis.

In embodiments of the present invention, mixing said used AHP pieces with a mixed plastic stream produces a mixed dry stream. In embodiments of the present invention, said mixed dry stream comprises about 15% said used AHP on a dry basis and about 75% said mixed plastic waste on a dry basis. In embodiments of the present invention, said mixed dry stream comprises between about 1% and about 30% said used AHP on a dry basis and about 70% and about 99% said mixed plastic waste on a dry basis 75% said mixed plastic waste on a dry basis.

In embodiments of the present invention, said used AHP stream comprises said used AHP, a mixed plastic waste, and an aqueous solution. In embodiments of the present invention, said used AHP stream comprises between about 5% and about 25% used AHP on a dry basis, between about 35% and about 75% mixed plastic waste on a dry basis, and between about 20% and about 60% said aqueous solution. In embodiments of the present invention, said used AHP stream comprises between about 10% and about 20% used AHP on a dry basis, between about 40% and about 70% mixed plastic waste on a dry basis, and between about 30% and about 50% said aqueous solution.

The used AHP stream may be 100% of used AHP or may also contain other waste materials, such as plastic waste, agricultural waste, food waste, mixed waste, depending on considerations like logistics of waste collection. The used AHP stream may be made of the dried used AHP and mixed plastic waste.

The melt stream may exit from the extruder at a pressure between about 2 MPa and about 30 MPa and a temperature between about 200° C. and about 380° C. The melt stream may be mixed with the aqueous solution in a mixer to form a mixed stream; the aqueous solution, may be pre-heated to supercritical conditions in heaters prior to the mixer. The mixed stream may be further heated with heaters prior to being fed into the HTT reactor. The extruder may be directly connected to the HTT reactor in a manner allowing the mixed stream to flow into the HTT reactor in a continuous flow. In embodiments of the present invention, the mixed stream comprises between about 40% and about 80% used AHP on a dry basis, and between about 20% and about 60% aqueous solution. In embodiments of the present invention, the mixed stream comprises between about 40% and about 80% used AHP and plastic waste on a dry basis, and between about 20% and about 60% aqueous solution, wherein the used AHP and plastic waste composition may be on a dry basis between about 1% of used AHP to about 100% of used AHP, between about 5% of used AHP to about 50% of used AHP. A molar ratio of hydrogen to carbon (H/C) of used AHP and plastic waste composition may be greater than about 2.15, greater than about 1.2, greater than about 1.0, or greater than about 0.8. The aqueous solution may be supercritical prior to said contacting. The aqueous solution may be subcritical prior to said contacting.

If the stream of aqueous solution is not provided, because for example the aqueous solvent is water and there is already enough water in the used AHP, the water may be brought to supercritical conditions in the extruder, prior to being fed into the HTT reactor, or in the HTT reactor.

In embodiments of the present invention, the aqueous solution comprises between about 5% and about 40% alcohol. In embodiments of the present invention, the aqueous solution comprises between about 5% and about 40% alcohol, wherein said alcohol is selected from the group consisting of methanol, ethanol, iso-propyl alcohol, iso-butyl alcohol, pentyl alcohol, hexanol, iso-hexanol, or any combination thereof. Without wishing to be bound by any theory, it is believed that the use of alcohol may be beneficial to control the swelling level of the SAP, contained in the used AHP. In embodiments of the present invention, the mixed stream comprises a catalyst selected from the group consisting of base catalyst, acid catalyst, water-gas-shift reaction catalyst, aluminosilicate catalyst, sulphide catalyst, or any combination thereof. The catalyst may be added to the mixed stream after the mixed stream has reached the HTT reactor temperature, or after the mixed stream has reached the HTT reactor temperature and the HTT reactor pressure. In addition, intrinsic catalysts may be present in the AHP, or in the vessel walls of the HTT reactor.

In embodiments of the present invention, no catalyst is used. The mixed stream may comprise between about 5% and about 60% of oil, optionally wherein the oil is recycled from a waste-derived-oil product previously generated in accordance with the method above. The oil may be paraffinic oil, gas-oil, crude oil, synthetic oil, coal-oil, bio-oil, shale oil, kerogen oil, mineral oil, white mineral oil, and aromatic oil.

The mixed stream may contain a solid substrate component, such as coal, coke, tar, char, ash, and mineral. Alternatively, fillers, already intrinsically present in the used AHP, such as calcium carbonate, zeolites, etc. may avoid the use of a solid substrate component.

In embodiments of the present invention, the used AHP is dried prior to its size reduction. In embodiments of the present invention, the dried used AHP has moisture between about 5% and about 50%. In embodiments of the present invention, the dried used AHP has moisture between about 10% and about 30%.

In embodiments of the present invention, a method for recycling a used AHP comprises: a) size reduction of said used AHP into pieces; b) mixing said used AHP pieces with a mixed plastic waste stream to produce a mixed dry stream; c) feeding said mixed dry stream to an extruder to produce a melt stream; d) providing an aqueous solution; and e) contacting said melt stream with said aqueous solution to produce a mixed wet stream.

III HTT Reactor

The HTT reactor can be of any type known to those skilled in the art. A non-limiting example of an HTT reactor is an autoclave. The degradation of a used AHP can be catalytic or non-catalytic, and can proceed in continuous, batch, or semi batch modes. The metal or alloy of construction of the HTT reactor can be stainless steel, carbon steel, or any other suitable metal or alloy. The HTT reactor apparatus may include a blow down valve for the removal of undesirable solids, such as coke, char, precipitated metal halides, calcium carbonate fillers, inorganic salts, metal or inorganic contamination of the feed materials, etc. The addition of a base to the melt stream, to the feed materials or mixed stream or reaction mixture may facilitate the formation of solids to be collected from the bottom of the HTT reactor. The HTT reactor may contain various zones with different temperatures, pressures, and residence times to degrade the various AHP components at specific conditions.

The degradation of the used AHPs may be carried out at any suitable temperature and pressure, which is measured in the HTT reactor. Without wishing to be bound by any theory, it is believed that the use of supercritical or subcritical water enables better heat exchange into the AHP, which may otherwise cause inefficient conversion of the used AHP and formation of char.

In embodiments of the present invention, the HTT reactor temperature is between about 250° C. and about 500° C. In embodiments of the present invention, the HTT reactor temperature is about 445° C. In embodiments of the present invention, the HTT reactor temperature is higher than about 300° C. In embodiments of the present invention, the HTT reactor temperature is higher than about 350° C. In embodiments of the present invention, the HTT reactor temperature is higher than about 400° C. In embodiments of the present invention, the HTT reactor temperature is between about 425° C. and about 500° C.

In embodiments of the present invention, the HTT reactor pressure is between about 0.1 MPa and about 30 MPa. In embodiments of the present invention, the HTT reactor pressure is between about 0.2 MPa and about 25 MPa. In embodiments of the present invention, the HTT reactor pressure is between about 1 MPa and about 20 MPa. In embodiments of the present invention, the HTT reactor pressure is higher than about 0.2 MPa. In embodiments of the present invention, the HTT reactor pressure is higher than about 1 MPa. In embodiments of the present invention, the HTT reactor pressure is higher than about 3 MPa. In embodiments of the present invention, the HTT reactor pressure is higher than about 10 MPa. In embodiments of the present invention, the HTT reactor pressure is higher than about 23 MPa. In embodiments of the present invention, the HTT reactor pressure is about 0.25 MPa. In embodiments of the present invention, the HTT reactor pressure is about 1.5 MPa. In embodiments of the present invention, the HTT reactor pressure is about 3.8 MPa. In embodiments of the present invention, the HTT reactor pressure is about 23 MPa.

In embodiments of the present invention, the HTT reactor temperature is higher than about 400° C. and the HTT reactor pressure is higher than about 10 MPa. In embodiments of the present invention, the HTT reactor temperature is about 450° C. and the HTT reactor pressure is higher than about 0.25 MPa. In embodiments of the present invention, the HTT reactor temperature is about 450° C. and the HTT reactor pressure is higher than about 1.5 MPa. In embodiments of the present invention, the HTT reactor temperature is about 450° C. and the HTT reactor pressure is higher than about 3.8 MPa. In embodiments of the present invention, the HTT reactor temperature is about 450° C. and the HTT reactor pressure is higher than about 10 MPa. In embodiments of the present invention, the HTT reactor temperature is about 445° C. and the HTT reactor pressure is about 23 MPa.

The HTT reactor residence time is defined as the average time the feed material spends in the HTT reactor, and its value can be of any suitable amount. In embodiments of the present invention, the HTT reactor residence time is longer than about 5 min. In embodiments of the present invention, the HTT reactor residence time is longer than about 10 min. In embodiments of the present invention, the HTT reactor residence time is longer than about 30 min. In embodiments of the present invention, the HTT reactor residence time is longer than about 45 min. In embodiments of the present invention, the HTT reactor residence time is longer than about 60 min. In embodiments of the present invention, the HTT reactor residence time is longer than about 90 min. In embodiments of the present invention, the HTT reactor residence time is longer than about 120 min. In embodiments of the present invention, the HTT reactor residence time is longer than about 150 min. In embodiments of the present invention, the HTT reactor residence time is between about 20 min and about 180 min. In embodiments of the present invention, the HTT reactor residence time is between about 30 min and about 150 min. In embodiments of the present invention, the HTT reactor residence time is between about 40 min and about 80 min. The residence time in the HTT reactor may be achieved via an array of multiple connected HTT reactors in series.

In embodiments of the present invention, an Absorbent Hygiene Product (AHP) comprises a non-woven, a backsheet film, and a superabsorbent polymer (SAP); wherein said non-woven comprises polypropylene (PP); wherein said backsheet film comprises polyethylene (PE); wherein said SAP comprises poly(acrylic acid) produced from propylene; wherein at least one of said PP, said PE, and said SAP are produced from a used AHP stream comprising a used AHP; and wherein said used AHP stream is fed into a hydrothermal treatment (HTT) reactor operating at an HTT reactor temperature, at an HTT reactor pressure, and for an HTT reactor residence time.

In embodiments of the present invention, an Absorbent Hygiene Product (AHP) comprises a non-woven, a backsheet film, and a superabsorbent polymer (SAP); wherein said non-woven comprises polypropylene (PP); wherein said backsheet film comprises polyethylene (PE); wherein said SAP comprises poly(acrylic acid) produced from propylene; wherein at least one of said PP, said PE, and said SAP are produced from a used AHP stream comprising a used AHP; wherein said used AHP is size reduced to pieces; wherein said pieces have an average size between about 0.1 mm and about 10 cm; wherein said used AHP stream is fed into an extruder to produce a melt stream; wherein said melt stream is contacted with an aqueous solution to produce a mixed stream; and wherein said mixed stream is fed into an HTT reactor operating at about 445° C., about 23 MPa, and for an HTT reactor residence time.

In embodiments of the present invention, a method for recycling a used absorbent hygiene product (used AHP) comprises feeding a stream comprising said used AHP in a hydrothermal treatment (HTT) reactor operating at an HTT reactor temperature, at an HTT reactor pressure, and for an HTT reactor residence time. In embodiments of the present invention, said HTT reactor temperature is higher than about 400° C.; said HTT reactor pressure is higher than about 3 MPa; and said HTT reactor residence time is longer than about 30 min. In embodiments of the present invention, a method for recycling a used AHP comprises: a) size reduction of said used AHP into pieces; b) mixing said used AHP pieces with a mixed plastic waste stream to produce a mixed dry stream; c) feeding said mixed dry stream to an extruder to produce a melt stream; d) providing an aqueous solution; e) contacting said melt stream with said aqueous solution to produce a mixed wet stream; and f) feeding said mixed wet stream in a hydrothermal treatment (HTT) reactor operating at an HTT reactor temperature, at an HTT reactor pressure, and for an HTT reactor residence time. In embodiments of the present invention, a method for recycling a used AHP comprises feeding a stream comprising said used AHP and mixed plastic waste in a hydrothermal treatment (HTT) reactor operating at an HTT reactor temperature of about 450° C., at an HTT reactor pressure of about 3.4 MPa, and for an HTT reactor residence time of about 45 min.

IV Product Stream

In embodiments of the present invention, the HTT reactor produces a product stream comprising a gas product stream, a liquid product stream, and a solid product. Typically, the gas product stream comprises hydrocarbons with $C_5$ and lower carbon chain lengths, although some small amounts of $C_6$ and above may also be present. Typically, the liquid product stream comprises hydrocarbons with $C_6$ up to $C_{31}$ carbon chain lengths, although some small amount of $C_5$ and above may also be present. In embodiments of the present invention, the gas product stream is between about 5% and about 50% of the product stream or between about 5% and about 30% of the product stream. In embodiments of the present invention, the liquid product stream is between about 50% and about 90% of the product stream or between about 70% and about 85% of the product stream. In embodiments of the present invention, the solid product is about 10% or less of the product stream or about 5% or less of the product stream. In embodiments of the present invention, the liquid product stream is about 75% of the product stream, the gas product stream is about 20% of the product stream, and the about 5% of the product stream. In embodiments of the present invention, the liquid product stream is about 85% of the product stream, the gas product stream is about 15% of the product stream, and the about 10% of the product stream.

In embodiments of the present invention, the liquid product stream is more than about 30% of the product stream on a dry basis. In embodiments of the present invention, the liquid product stream is more than about 50% of the product stream on a dry basis. In embodiments of the present invention, the liquid product stream is more than about 60% of the product stream on a dry basis. In embodiments of the present invention, the liquid product stream is more than about 70% of the product stream on a dry basis. In embodiments of the present invention, the liquid product stream is more than about 80% of the product stream on a dry basis. In embodiments of the present invention, the liquid product stream has a calorific value higher than about 30 MJ/kg. In embodiments of the present invention, the liquid product stream has a calorific value higher than about 40 MJ/kg. In embodiments of the present invention, the liquid product stream has a calorific value higher than about 45 MJ/kg.

In embodiments of the present invention, the liquid stream comprises nitrogen at a concentration of less than about 100 ppm. In embodiments of the present invention, the liquid product stream comprises oxygen at a concentration of less than about 100 ppm. In embodiments of the present invention, the liquid product stream comprises chlorine at a concentration of less than about 5 ppm. In embodiments of the present invention, the liquid product stream comprises chlorine at a concentration of less than about 3 ppm. In embodiments of the present invention, the liquid product stream comprises iron at a concentration of less than about 0.001 ppm. In embodiments of the present invention, the liquid product stream comprises sodium at a concentration of less than about 0.125 ppm. In embodiments of the present invention, the liquid product stream comprises calcium at a concentration of less than about 0.5 ppm.

In embodiments of the present invention, the liquid product stream is treated to produce a stream suitable for feeding into a stream cracker. In embodiments of the present invention, the liquid product stream is treated with hydrogen and contains nitrogen at a concentration of less than about 100 ppm, oxygen at a concentration of less than about 100 ppm, chlorine at a concentration of less than about 3 ppm, iron at a concentration of less than about 0.001 ppm, sodium at a concentration of less than about 0.125 ppm, and calcium at a concentration of less than about 0.5 ppm. In embodiments of the present invention, the liquid product stream is treated to produce a stream suitable for feeding into a stream cracker. In embodiments of the present invention, the liquid product stream is treated with hydrogen and contains nitrogen at a concentration of less than about 100 ppm, oxygen at a concentration of less than about 100 ppm, chlorine at a concentration of less than about 5 ppm, iron at a concentration of less than about 0.001 ppm, sodium at a concentration of less than about 0.125 ppm, and calcium at a concentration of less than about 0.5 ppm.

In embodiments of the present invention, the liquid product stream comprises a low molecular weight hydrocarbon. In embodiments of the present invention, the liquid product stream comprises waste-derived fuel products. In embodiments of the present invention, the liquid product stream comprises naphtha. In embodiments of the present invention, the liquid product stream comprises diesel. In embodiments of the present invention, the liquid product stream comprises gasoline.

The waste-derived fuel products may comprise multiple phases, including but not limited to a water-soluble aqueous phase and a water insoluble phase. The water-insoluble phase may also be called oil phase and comprises known fuel fractions, such as naphtha and diesel. The water soluble phase may comprise, compounds including, but not limited to, any one or more of carbohydrates, aldehydes, carboxylic acids, carbohydrates, phenols, furfurals, alkenes, alkanes, aromatic hydrocarbons, styrene, ethylbenzene, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopentenones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-trihydroxybenzenes, alkyl- and alkoxy-hydroquinones, indenes and indene-derivatives. The water insoluble phase may comprise, compounds including, but not limited to, any one or more of alkenes, alkanes, aromatic hydrocarbons, styrene, ethylbenzene, waxes, aldehydes, carboxylic acids, carbohydrates, phenols, furfurals, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy cyclopentanones, and cyclohexanones, cyclopentenones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-trihydroxybenzenes, alkyl- and alkoxy-hydroquinones, indenes and indene-derivatives. Exemplary compounds comprised in the water insoluble liquid phase are i-butane, butene-1, n-butane, iso-butylene, t-butene-2, c-butene-2, i-pentane, pentene-1, 2-methylbutene-1, n-pentane, t-pentene-2, c-pentene-2, 2-methylbutene-2, cyclopentene, 4-methylpentene-1, cyclopentane, 2,3-dimethylbutene-1, 2-methylpentane, 3-methylpentane, 4-methyl-t-pentene-2, 2-methylpentene-1, hexene-1, n-hexane, t-hexene-3, c-hexene-3, t-hexene-2, 2-methylpentene-2, 3-methyl-c-pentene-2, 3-methylcyclopentene, c-hexene-2, 3,3-dimethylpentene-1, methylcyclopentane, 2,4-dimethylpentane, 2,3,3-trimethylbutene-1, 4,4-dimethyl-c-pentene-2, benzene, 2-methyl-c-hexene-3, 5-methylhexene-1, cyclohexane, 2-methyl-t-hexene-3, heptane-1, n-heptane, methylcyclohexane, toluene, 4-methylheptane, octene-1, n-octane, 3,5-dimethylheptane, ethylbenzene, 1c,2t,4t-trimethylcyclohexane, 1,3-dimethylbenzene, n-nonane, n-decane, n-undecane. A naphtha fraction may be separated from the liquid product stream, having boiling point below 175° C. The average molecular weight of the naphtha fraction may be between 90 and 220 g/mol, or between 100 and 130 g/mol. The relative density of the naphtha fraction may be between 0.65 and 0.8. The octane number of the naphtha fraction may be between 50 and 90. Other non-limiting examples of waste-derived fuel products include oil char (e.g., carbon char with bound oils), char, and gaseous product (e.g., methane, hydrogen, carbon monoxide and/or carbon dioxide, ethane, ethene, propene, propane).

In embodiments of the present invention, the waste-derived fuel products comprise n-paraffins, iso-paraffins, naphthenes, olefins, aromatics, or mixtures thereof. In embodiments of the present invention, said waste-derived products comprise naphtha. In embodiments of the present invention, the n-paraffins are between about 5% and about 40% of the liquid product stream. In embodiments of the present invention, the iso-paraffins are between about 4% and about 30% of the liquid product stream. In embodiments of the present invention, the naphthenes are between about 5% and about 30% of the liquid product stream. In embodiments of the present invention, the olefins are between about 5% and about 30% of the liquid product stream. In embodiments of the present invention, the aromatics are between about 5% and about 30% of the liquid product stream.

In embodiments of the present invention, the waste-derived fuel products comprise n-paraffins and iso-paraffins between about 20% and about 50%. In embodiments of the present invention, the waste-derived fuel products comprise naphthenes between about 10% and about 20%. In embodiments of the present invention, the waste-derived fuel products comprise olefins between about 10% and about 20%. In embodiments of the present invention, the waste-derived fuel products comprise aromatics between about 5% and about 20%. In embodiments of the present invention, the waste-derived fuel products comprise paraffins (n-paraffins and iso-paraffins) between about 20% and about 50%; naphthenes between about 10% and about 20%; olefins between about 10% and about 20%; and aromatics between about 5% and about 20%. In embodiments of the present invention, the waste-derived fuel products comprise paraffins about 48%; naphthenes about 15%; olefins about 18%; and aromatics about 10%.

In embodiments of the present invention, a method for recycling a used absorbent hygiene product (used AHP) comprises feeding said used AHP in a hydrothermal treatment (HTT) reactor at an HTT reactor temperature, at an HTT reactor pressure, and for an HTT reactor residence time; and wherein a liquid product stream from said HTT reactor comprises waste-derived fuel products.

In embodiments of the present invention, a method for recycling a used AHP comprises: 1) size reduction of the used AHP to pieces; 2) feeding the pieces to an extruder to produce a melt stream; 3) providing an aqueous solution; 4) contacting the melt stream with the aqueous solution to produce a mixed stream; 5) feeding the mixed stream in an HTT reactor at an HTT reactor temperature, at an HTT reactor pressure, and for an HTT reactor residence time; 6) producing a liquid product stream comprising waste-derived fuel products; and 7) depressurizing and cooling the liquid product stream.

In embodiments of the present invention, a method for recycling a used AHP comprises: 1) size reduction of the used AHP to pieces; 2) providing an aqueous solution; 3) contacting the AHP pieces with the aqueous solution to produce a mixed stream; 4) feeding the mixed stream in an HTT reactor at an HTT reactor temperature, at an HTT reactor pressure, and for an HTT reactor residence time; 5) producing a liquid product stream comprising waste-derived fuel products; and 6) depressurizing and cooling the liquid product stream.

One or more of the waste-derived fuel products may comprise less than about 10% oxygen, preferably less than about 5% oxygen, more preferably less than about 2% oxygen, even more preferably less than about 0.5% oxygen, and most preferably less than about 0.1% oxygen. Without wishing to be bound by any theory, it is believed that the use of water in the HTT reactor enables the reduction of the oxygen content in the liquid product stream. This is very important as AHPs may contain materials with significant oxygen content, such as polyester, SAP, cellulose, which would otherwise reduce the value of the waste-derived fuel products. The waste-derived fuel products may be further treated in order to reduce their oxygen content.

One or more of the waste-derived fuel products may contain less than about 5% nitrogen, preferably less than about 1% nitrogen, more preferably less than about 0.5% nitrogen, and most preferably less than about 0.1% nitrogen. Without wishing to be bound by any theory, it is believed that the use of water in the HTT reactor enables the reduction of the nitrogen content in the liquid product stream. This is very important as AHPs may contain significant nitrogen content, such as urea contained in the human exudates, which would otherwise reduce the value of the waste-derived fuel products. In addition reducing nitrogen content in one or more of the waste-derived fuel products may be achieved via removing, at least partly, urea contained in human exudates: this may be done for example subjecting the used AHP to a pre-treatment to de-swell the SAP, for example with a calcium compound or an organic acid solution as known in the art (U.S. Pat. No. 9,777,131; and U.S. Patent Application US 2017/0107667), then removing the urea from the liquid phase with methods known in the art, such as those used in wastewater treatment, e.g. electrochemical oxidation, adsorption, biological treatment, hydrolysis. In addition, the diaper design may be made such as to reduce the content of nitrogen, for example replacing the polyurethane-based components, such as the elastics, with synthetic rubber-based components. The waste-derived fuel products may be further treated in order to reduce the nitrogen content.

One or more of the waste-derived fuel products may contain less than about 1% chlorine, preferably less than about 0.1% chlorine, more preferably less than about 0.01% chlorine, and most preferably less than about 0.005% chlorine. Used AHP may contain significant amount of chlorine due to the salts, such as sodium chlorides, contained in the human exudates. Without wishing to be bound by any theory, being salts, like sodium chlorides, water soluble, they may preferably partition into the water-soluble aqueous phase, hence yielding a water insoluble liquid phase with lesser chlorine content. In addition, the transfer of halogens, such as chlorine, present in the reaction mixture to the water-soluble aqueous phase as inorganic halides may reduce issues around dioxin formation. In addition reducing chlorine content in one or more of the waste-derived fuel products may be achieved via removing, at least partly, chlorides contained in human exudates absorbed in the AHPs: this may be done for example subjecting the used AHP to a pre-treatment to de-swell the SAP, for example with a calcium compound or an organic acid solution as known in the art (U.S. Pat. No. 9,777,131; and U.S. Patent Application US 2017/0107667), then removing the chlorides from the water phase with methods known in the art, such as reverse osmosis, distillation or electro-dialysis. In addition, the diaper design may be made such as to reduce the content of chlorine, for example avoiding chlorine containing polymers and additives in the formulation of the AHP: as an example chlorine free pulp may be used. The waste-derived fuel products may be further treated in order to reduce the chlorine content.

One or more of the waste-derived fuel products may contain less than about 1% sulfur, preferably less than about 0.1% sulfur, more preferably less than about 0.01% sulfur, and most preferably less than about 0.005% sulfur. Used AHP may contain significant amount of sulfur due to sulfur containing compounds contained in the human exudates, for example sulfates, cystine. Without wishing to be bound by any theory, being these sulfur containing compounds water soluble, they may preferably partition into the water-soluble aqueous phase, hence yielding a water insoluble liquid phase with lesser sulfur content. In addition reducing sulfur content in one or more of the waste-derived fuel products may be achieved via removing, at least partly, sulfur compounds contained in the human exudates, absorbed by the AHPs: this may be done for example subjecting the used AHP to a pre-treatment to de-swell the SAP, for example with a calcium compound or an organic acid solution as known in the art (U.S. Pat. No. 9,777,131; and U.S. Patent Application US 2017/0107667), then removing the sulfur compounds from the liquid phase with methods known in the art, such as reverse osmosis. In addition, the diaper design may be made such as to reduce the content of sulfur, for example avoiding sulfur containing polymers and additives in the formulation of the AHP. The waste-derived fuel products may be further treated in order to reduce the sulfur content.

After depressurizing and cooling the waste-derived fuel products, they may be subjected to further separation techniques to recover one or more of a gaseous, aqueous, oil, and/or wax component from the product, and/or separating one or more fractions of an oil, and/or one or more fractions of a wax component from the product. For example, upon depressurization and cooling the synthetic crude oil will separate from the water in the flash tank and float on the water, being of lower density than water. Gas and vapor will also be separated at this point. The gas will be calorific and can be combusted to provide energy to the process. The separation of the two liquid phases can be further improved by use of, for example, a centrifuge. The oil phase can be subjected to further processing, for example it can be distilled to provide fractions such as naphtha, middle distillates, heavy gas oils and vacuum gas oils, and waxes. Waxes and partly converted polymers may optionally be recycled as feed to the front of the process for further cracking. Naphtha and other fractions may optionally be added to the reaction mixture, for example by injection after the extruder barrel or after the mixing piece, to act as solvents to lower the fluid viscosity and modify the phase behavior.

Waste-derived fuel products can be separated and recycled into one or more fractions having a boiling point between about 30° C. and about 140° C., between about 60° C. and about 160° C., between about 140° C. and about 205° C., between about 150° C. and about 300° C., or between about 230° C. and about 350° C. For example, waste-derived fuel products can be separated and recycled into one or more fractions of the product comprising a wax or a waxy oil having a boiling point above 370° C. atmospheric equivalent boiling point (AEBP), above 400° C. AEBP, above 450° C. AEBP, above 500° C. AEBP, or above 550° C. AEBP.

An additional benefit of the present invention is the reduced formation of char, which is undesired as valuable carbon is subtracted from the more valuable water insoluble liquid phase, which comprises naphtha and diesel. Without wishing to be bound by any theory, it is believed that the use of water in an HTT reactor reduces the formation of char, in particular from cellulosic materials but also from synthetic polymer materials, contained in the AHP.

Further the method comprises separating and recycling a fraction of the waste-derived fuel products having a boiling point in the range of: naphtha boiling range, heavy naphtha boiling range, kerosene boiling range, diesel boiling range, heavy gas oil boiling range, or vacuum gas oil boiling range. Typically, the waste-derived fuel products have lower average molecular weight than the polymeric materials, comprised in the used AHP, prior to conversion. Further any of the fractions above may be combusted to provide heat for repeating the method.

In embodiments of the present invention, an Absorbent Hygiene Product (AHP) comprises a non-woven, a backsheet film, and a superabsorbent polymer (SAP); wherein said non-woven comprises polypropylene (PP); wherein said backsheet film comprises polyethylene (PE); wherein said SAP comprises poly(acrylic acid) produced from propylene; wherein at least one of said PP, said PE, and said SAP are produced from a used AHP stream comprising a used AHP; wherein said used AHP stream is fed into a hydrothermal treatment (HTT) reactor operating at an HTT reactor temperature, at an HTT reactor pressure, and for an HTT reactor residence time; wherein said HTT reactor produces a liquid product stream, a gas product stream, and a solid product; and wherein said liquid product stream comprises waste-derived fuel products.

In embodiments of the present invention, an Absorbent Hygiene Product (AHP) comprises a non-woven, a backsheet film, and a superabsorbent polymer (SAP); wherein said non-woven comprises polypropylene (PP); wherein said backsheet film comprises polyethylene (PE); wherein said SAP comprises poly(acrylic acid) produced from propylene; wherein at least one of said PP, said PE, and said SAP are produced from a used AHP stream comprising a used AHP; wherein said used AHP is size reduced to pieces; wherein said pieces have an average size between about 0.1 mm and about 10 cm; wherein said used AHP stream is fed into an extruder to produce a melt stream; wherein said melt stream is contacted with an aqueous solution to produce a mixed stream; wherein said mixed stream is fed into an HTT reactor operating at about 445° C., about 23 MPa, and for an HTT reactor residence time; wherein said HTT reactor produces a liquid product stream, a gas product stream, and a solid product; and wherein said liquid product stream comprises waste-derived fuel products; wherein said waste-derived fuel products comprise n-paraffins, iso-paraffins, naphthenes, olefins, aromatics, or mixtures thereof; wherein said n-paraffins and said iso-paraffins comprise about 48% of said waste-derived fuel products, said naphthenes comprise about 15% of said waste-derived fuel products, said olefins comprise about 18% of said waste-derived fuel products, and said aromatics comprise about 10% of said waste-derived fuel products; wherein waste-derived fuel products comprise less than about 100 ppm nitrogen, less than about 100 ppm oxygen, less than about 5 ppm chlorine, less than about 0.001 ppm iron, less than about 0.125 ppm sodium, and less than about 0.5 ppm calcium.

In embodiments of the present invention, said waste-derived fuel products comprise between about 50% and about 55% paraffins, between about 40% and about 45% olefins and naphthenes, and about 5% aromatics. In embodiments of the present invention, said waste-derived fuel products comprise between about 45% and about 60% paraffins, between about 30% and about 55% olefins and naphthenes, and between about 2% and about 15% aromatics. In embodiments of the present invention, said waste-derived fuel products comprise between about 50% and about 55% paraffins, between about 35% and about 50% olefins and naphthenes, and between about 5% and about 10% aromatics. In embodiments of the present invention, a method for recycling a used absorbent hygiene product (used AHP) comprises feeding a stream comprising said used AHP in a hydrothermal treatment (HTT) reactor operating at an HTT reactor temperature, at an HTT reactor pressure, and for an HTT reactor residence time; and producing a liquid product stream, wherein said liquid product stream comprises waste-derived fuel products. In embodiments of the present invention, a method for recycling a used AHP comprises: a) size reduction of said used AHP into pieces; b) mixing said used AHP pieces with a mixed plastic waste stream to produce a mixed dry stream; c) feeding said mixed dry stream to an extruder to produce a melt stream; d) providing an aqueous solution; e) contacting said melt stream with said aqueous solution to produce a mixed wet stream; f) feeding said mixed wet stream in a hydrothermal treatment (HTT) reactor operating at an HTT reactor temperature, at an HTT reactor pressure, and for an HTT reactor residence time; g) producing a liquid product stream from said HTT reactor comprising waste-derived fuel products; and h) depressurizing and cooling said liquid product stream. In embodiments of the present invention, a method for recycling a used AHP comprises feeding a stream comprising said used AHP and mixed plastic waste in a hydrothermal treatment (HTT) reactor operating at an HTT reactor temperature of about 450° C., at an HTT reactor pressure of about 3.4 MPa, and for an HTT reactor residence time of about 45 min; and wherein a liquid product stream from said HTT reactor comprises waste-derived fuel products.

V Recycled AHP

The liquid product stream can be fed into a steam cracker to produce ethylene, propylene, and other chemicals that can be used to produce polyethylene, polypropylene, polyester, adhesives, SAP, etc. which can form a recycled AHP. A waste-derived fuel product may be further processed to be made compatible with a cracker unit to obtain base monomers, such as ethylene and propylene, which may then be used to produce new polymers, such as polyethylene, polypropylene, polyacrylate, etc., which may be used to produce new diapers or other market products or packaging.

In embodiments of the present invention, the waste-derived fuel products are fed into a steam cracker; and wherein the steam cracker produces a product stream comprising ethylene and propylene. In embodiments of the present invention, the ethylene is converted to the PE, part of the propylene is converted to the PP, and part of the propylene is converted to the SAP.

In embodiments of the present invention, an absorbent hygiene product (AHP) comprises at least one component which has been produced from waste-derived fuel products, wherein the waste-derived fuel products have been produced from recycling a used AHP according to any of the embodiments above. In embodiments of the present invention, the AHP comprises at least one of the PE, the PP, and the SAP.

VI EXAMPLES

Example 1—100% HDPE

About 3.0 g of high-density polyethylene (HDPE; Formolene® HB5502F from Formosa Plastics Corp., Livingston, NJ) and about 9 g of water were introduced into a 75 mL reactor (Parr Series 4740; Parr Instrument Company, Moline, IL). Air was removed from the reactor by pressurizing it with nitrogen and venting. The reactor was charged with 40 psig (0.28 MPa) nitrogen, heated to about 450° C. over 4 h, and kept at that temperature for about 45 min. The pressure inside the reactor reached about 450 psig (3.1 MPa). Then, the reactor was cooled to ambient temperature, vented, and opened yielding a soft waxy solid phase (liquid product stream) and an aqueous phase. The phases were separated, and the soft waxy solid phase was dissolved in chloroform and filtered. The filtrate was washed with brine, dried over magnesium sulfate, and concentrated. About 2.6 g of a soft waxy solid were recovered. The rest was gaseous products.

The soft waxy solid was analyzed using a Gas Chromatography—Mass Spectrometry/Flame Ionization Detector (GC-MS/FID) method, which included the following parameters: System: Agilent 7890B GC/5977B MSD/FID with 7693A Automatic Liquid Sampler (ALS); GC Column: Agilent DB-5MS (#121-5522), 20 m×0.18 mm I.D., film Thickness. 0.18 µm; GC Oven Program: 50° C. (2 min)-10° C./min-340° C. (4 min), Total 35 min; Injection Temp: 300° C., 1 µL Liquid Injection, Split Ratio 1:50; Column Flow: 1.2 mL/min (Constant Flow Mode); Average Velocity:

48.896 cm/sec (MSD), 41.782 cm/sec (FID); Initial Pressure: 23.863 psi (MSD), 26.568 psi (FID); (MSD) MSD Transfer Line Temp: 320° C.; MS Source Temp: 230° C.; MS Quad Temp: 150° C.; Acquisition Mode: Scan m/z 35—m/z 700; (FID) Heater Temp: 360° C.; $H_2$ Flow: 40 mL/min; Air Flow: 400 mL/min; Makeup Flow (Nitrogen): 25 mL/min; and (Solvent/Reagent): Dichloromethane: 99.9% for residual analysis (w/Amylene), 2.5 L, CAS: 75-09-2, Acros Organics Code #326760025; n-Hydrocarbon Standard Mix: Standard Mixture of n-Alkanes ($C_{10}$-$C_{40}$, 50 μg/mL each in Hexane), Restek #31678; and (Sample Preparation): 10 mg sample was diluted with 1 mL Dichloromethane (10 mg/mL solution); and (Sample Analyses): 1 μL of sample solutions and HC Standard Mix were analyzed by GC/MSD (peak IDs) and GC/FID (compositional analyses). The GC-MS/FID analysis showed that the liquid product stream contained between about 50% and about 55% paraffins, between about 40% and about 45% olefins and naphthenes, and about 5% aromatics.

Example 2—98% HDPE and 2% Diaper

About 2.92 g of high-density polyethylene (HDPE; Formolene® HB5502F from Formosa Plastics Corp., Livingston, NJ), about 0.06 g of diaper material (consisting of about 17.4% cellulose, 26.6% polypropylene, and 56% polyacrylate-based superabsorbent polymer), and about 9 g of water were introduced into a 75 mL reactor (Parr Series 4740; Parr Instrument Company, Moline, IL). The HDPE was about 98% and the diaper material was about 2% of the solids in the reactor, representing a feed stream light in used diapers. Air was removed from the reactor by pressurizing it with nitrogen and venting. The reactor was charged with 40 psig (0.28 MPa) nitrogen, heated to about 450° C. over about 4 h, and kept at that temperature for about 45 min. The pressure inside the reactor reached about 500 psig (3.4 MPa). Then, the reactor was cooled to ambient temperature, vented, and opened yielding a soft waxy solid phase (liquid product stream) and an aqueous phase. The phases were separated, and the soft waxy solid phase was dissolved in chloroform and filtered. About 130 mg of a solid was recovered. The filtrate was washed with brine, dried over magnesium sulfate, and concentrated. About 2.5 g of a soft waxy solid were recovered. The aqueous layer was acidified to pH 1 and extracted with diethyl ether. The diethyl ether extract was washed with brine, dried over magnesium sulfate, and concentrated. About 27 mg of a dark brown oil were recovered. The rest was gaseous products. The liquid product stream was analyzed using the GC-MS/FID method described in Example 1 and showed that it contained between about 50% and about 55% paraffins, between about 40% and about 45% olefins and naphthenes, and about 5% aromatics.

Example 3—75% HDPE and 25% Diaper

About 2.25 g of high-density polyethylene (HDPE; Formolene® HB5502F from Formosa Plastics Corp., Livingston, NJ), about 0.75 g of diaper material (consisting of about 17.4% cellulose, 26.6% polypropylene, and 56% polyacrylate-based superabsorbent polymer), and about 9 g of water were introduced into a 75 mL reactor (Parr Series 4740; Parr Instrument Company, Moline, IL). The HDPE was about 75% and the diaper material was about 25% of the solids in the reactor, representing a feed stream heavy in used diapers. Air was removed from the reactor by pressurizing it with nitrogen and venting. The reactor was charged with 40 psig (0.28 MPa) nitrogen, heated to about 450° C. over about 4 h, and kept at that temperature for about 45 min. The pressure inside the reactor reached about 500 psig (3.4 MPa). Then, the reactor was cooled to ambient temperature, vented, and opened yielding a soft waxy solid phase (liquid product stream) and an aqueous phase. The phases were separated, and the soft waxy solid phase was dissolved in chloroform and filtered. About 140 mg of solids were recovered. The filtrate was washed with brine, dried over magnesium sulfate, and concentrated. About 1.7 g of a soft waxy solid were recovered. The aqueous layer was acidified to pH 1 and extracted with diethyl ether. The diethyl ether extract was washed with brine, dried over magnesium sulfate, and concentrated. About 70 mg of a dark brown oil was recovered. The rest was gaseous products. The liquid product stream was analyzed using the GC-MS/FID method described in Example 1 and showed that it contained between about 50% and about 55% paraffins, between about 40% and about 45% olefins and naphthenes, and about 5% aromatics.

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for recycling a used absorbent hygiene product (used AHP) comprising feeding a stream comprising said used AHP and a mixed plastic waste in a hydrothermal treatment (HTT) reactor operating at an HTT reactor temperature, at an HTT reactor pressure, and for an HTT reactor residence time; and producing a liquid product stream, wherein said liquid product stream comprises waste-derived fuel products;
   wherein said HTT reactor temperature is higher than about 400° C.; wherein said HTT reactor pressure is higher than about 3 MPa; and wherein said HTT reactor residence time is longer than about 30 min.

2. The method of claim 1, wherein said stream further comprises an aqueous solution.

3. The method of claim 2, wherein said stream comprises between about 40 wt. % and about 80 wt. % used AHP on a dry basis and between about 20 wt. % and about 60 wt. % aqueous solution.

4. The method of claim 1, wherein said liquid product stream comprises naphtha.

5. The method of claim 1, wherein said waste-derived fuel products comprise between about 50 wt. % and about 55 wt. % paraffins, between about 40 wt. % and about 45 wt. % olefins and naphthenes, and about 5 wt. % aromatics.

6. A method for recycling a used AHP comprising:
   a. size reduction of said used AHP into pieces;
   b. mixing said used AHP pieces with a mixed plastic waste stream to produce a mixed dry stream;
   c. feeding said mixed dry stream to an extruder to produce a melt stream;
   d. providing an aqueous solution;
   e. contacting said melt stream with said aqueous solution to produce a mixed wet stream;
   f. feeding said mixed wet stream in a hydrothermal treatment (HTT) reactor operating at an HTT reactor temperature, at an HTT reactor pressure, and for an HTT reactor residence time;
   g. producing a liquid product stream from said HTT reactor comprising waste-derived fuel products; and
   h. depressurizing and cooling said liquid product stream; wherein said HTT reactor temperature is higher than about 400° C.; wherein said HTT reactor pressure is higher than about 3 MPa; and wherein said HTT reactor residence time is longer than about 30 min.

7. The method of claim 6, wherein said size reduction is selected from the group consisting of grinding, chipping, pelletization, granulation, flaking, powdering, shredding, milling, compression and expansion, and combinations thereof.

8. The method of claim 7, wherein said used AHP pieces have an average size; and wherein said average size is between about 0.1 mm and about 10 cm.

9. The method of claim 6, wherein said mixed wet stream comprises between about 40 wt. % and about 80 wt. % used AHP and mixed plastic waste on a dry basis, and between about 20 wt. % and about 60 wt. % aqueous solution.

10. The method of claim 6, wherein said mixed dry stream comprises between about 1 wt. % and about 30 wt. % said used AHP on a dry basis and between about 70 wt. % and about 99 wt. % said mixed plastic waste on a dry basis.

11. The method of claim 10, wherein said mixed dry stream comprises about 25 wt. % said used AHP on a dry basis and about 75 wt. % said mixed plastic waste on a dry basis.

12. The method of claim 11, wherein said waste-derived fuel products comprise between about 50 wt. % and about 55 wt. % paraffins, between about 40 wt. % and about 45 wt. % olefins and naphthenes, and about 5 wt. % aromatics.

13. A method for recycling a used AHP comprising feeding a stream comprising said used AHP and mixed plastic waste in a hydrothermal treatment (HTT) reactor operating at an HTT reactor temperature of about 450° C., at an HTT reactor pressure of about 3.4 MPa, and for an HTT reactor residence time of about 45 min; and wherein a liquid product stream from said HTT reactor comprises waste-derived fuel products.

14. The method of claim 13, wherein said stream comprising said used AHP and mixed plastic waste comprises between about 1 wt. % and about 30 wt. % said used AHP on a dry basis and between about 70 wt. % and about 99 wt. % said mixed plastic waste on a dry basis.

15. The method of claim 14, wherein said stream comprises about 25 wt. % said used AHP on a dry basis and about 75 wt. % said mixed plastic waste on a dry basis.

16. The method of claim 13, wherein said waste-derived fuel products comprise between about 50 wt. % and about 55 wt. % paraffins, between about 40 wt. % and about 45 wt. % olefins and naphthenes, and about 5 wt. % aromatics.

* * * * *